Oct. 12, 1937.  C. L. EKSERGIAN  2,095,945
ARTILLERY WHEEL
Filed May 1, 1934
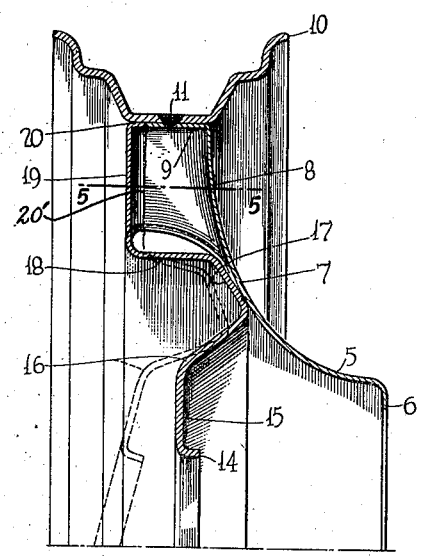
FIG.1
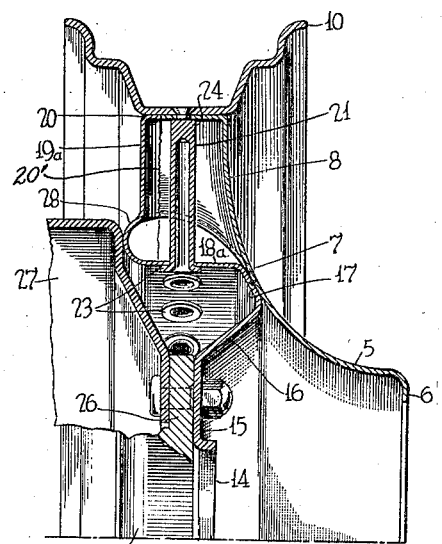
FIG.2
FIG.5
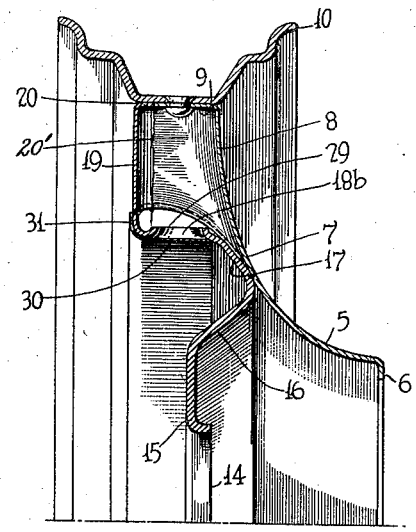
FIG.3
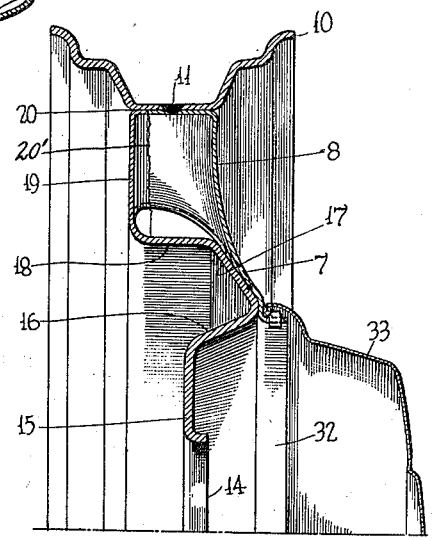
FIG.4
INVENTOR.
CAROLUS L. EKSERGIAN.
BY
ATTORNEY.

Patented Oct. 12, 1937

2,095,945

UNITED STATES PATENT OFFICE 2,095,945

ARTILLERY WHEEL

Carolus L. Eksergian, Detroit, Mich., assignor to Budd Wheel Company, Philadelphia, Pa., a corporation of Pennsylvania Application May 1, 1934, Serial No. 723,304

9 Claims. (Cl. 301—9)

My invention relates to artillery steel wheels, and the method of forming them, and particularly to closed hollow sheet metal wheels made up as a composite of component spiders, at least one of which is of open hollow section and is closed by the other. In such a wheel, problems of welding, bracing, mounting the rim to the spokes and other factors enter which are of widely variegated nature, such that similar features in wheels of slightly different design preclude the employment of one kind of welding or feature of structure or assembly which could be employed in another.

For instance, in the wheel of the present invention, it is desired to have a composite spider made up of only two pieces of material having a cross base annulus therebetween, which must therefore necessarily be an integral part of one of the component spiders. It is also desired to flash weld the spokes of the respective spiders to each other, and to spot weld the cross brace of the one to the other. Also, provision must be made for securing the outer ends of the composite spokes to a rim, or for inserting tension spokes inside the hollow spokes.

To effect similar results with a wheel in which the spiders and the brace are three separate members, the spiders may first be flash welded along the spokes, the spokes attached to the rim, and the brace subsequently inserted. In the instant case, the brace part of the one spider must be kept out of engagement with the other spider, while the spokes are flash welded, after which, the brace part may be engaged to the other spider and spot welded. Also, provision must be made for attaching the spokes to the rim, which may be done, in one case, by holding the brace part a sufficient distance from the other spider while operating radially outwardly through the spokes, and, in another case, by providing radial holes in the spider carrying the brace.

The resultant structure, in either case, is simple and durable in construction, economical to manufacture and effective in its operation; providing desirable fabrication, assembly and welding features, as well as other features of advantage, as will be better understood from a consideration of the ensuing description and accompanying drawing, in which Figure 1 is an axial section, through a spoke, of a portion of a wheel embodying the invention, showing, in broken lines, a portion of the structure as positioned during an intermediate stage of assembly, Figure 2 is a view similar to Fig. 1, of a modified form of the invention, together with other parts of a wheel not shown in Figure 1, Figure 3 is a view similar to Figure 1, of another modification of the invention, and Figure 4 is a view also like Figures 1 and 3, of a further modified form of the invention, as adapted for the reception of a hub cap differing from hub caps adapted to the structures of the other figures.

Figure 5 is a cross sectional view through a spoke as indicated by the line 5—5 of Figure 1.

Referring to Fig. 1, a front spider, preferably of thinner sheet metal than the rear spider and which may be only a fairing, although preferably adapted to share the load, comprises a hub shell 5 including an inner radial flange 6 for supporting a hub cap, and a conical nave 7 extending into rear-opening spoke portions 8 of deep channel cross section having outer end closures 9. The latter are secured to a rim 10, as by a weld body 11, or other suitable means.

A rear or main load spider, preferably of heavier gauge metal, comprises a radially inner axial flange 14, a bolting on flange 15, a conical annulus 16 diverging forwardly from the flange 15 to a rearwardly-diverging conical annulus 17 that is secured, preferably by spot welding, in flat side engagement with the nave 7 and has a rearwardly-extending axially extending annulus 18 terminating in and merging with front opening shallow channel section spoke portions 19 having closed outer ends 20, the single piece of metal constituting the rear spider and the brace represented by the parts between the spokes 19 and the flange 15, thus extending successively outwardy from the flange 14 and through the parts 15, 16, 17, 18 and 19 to the ends 20. Before securing any of the parts, that is, also, before mounting the rim 10, the spiders are brought together with the open side edges of the spoke portions and end closures in axially registering position for flash welding along the line indicated at 20'. In this position, the rear spider is formed with its spoke portions, as shown in full lines, and its portions 14, 15, 16, 17 and 18 in the positions indicated by broken lines in Fig. 1. The flash weld is then effected. After this operation, with the broken line parts still as shown, the outer ends of the composite spokes are welded, riveted or otherwise secured to the rim, by manipulating a tool radially outwardly in the spokes from a position between the axially-spaced inner spider parts. Subsequently, the dotted line portions are moved to the full line position, with the part 17 between the radial limits of the rear spider being moved in flat side engagement with the nave 7 to which it is preferably secured by spot welding. The rear spider parts my be otherwise shaped and positioned before bending or fixing the part 17 into engagement with the nave 7, the dotted line position indicated being merely illustrative of the general principle, and providing a closed hollow composite spider comprising component front and rear elements and a brace, all in two pieces of metal.

In the form shown in Fig. 2, in which corresponding parts are designated by corresponding reference characters, the rear spider, instead of having its inner annulus parts displaced from the spokes by so great a distance as in the form of Fig. 1, before attachment to the nave, has these parts displaced only sufficiently to prevent short circuiting the flash weld path at the spokes, this result being effected either by having the part 17 definitely sprung away from the nave during flash welding of the spokes, or by having the rear spider of finished shape and holding it slightly away from the nave, as by the insertion of insulating strips.

With such construction and method, the outer ends of the spokes are secured to the rim through radial holes opposite the spokes in the axial section 18a. As shown, the spokes and rim are joined, and tension spokes 21 provided in the hollow spokes and secured to the section 18a in the apertures therein, which are thereby closed. The spokes 21 are preferably of hollow or tubular section for the greater parts of their lengths having flanges or peened-over inner margins 23, and solid outer end lengths 24 having reduced necks and outer end heads riveted in position.

In the form of Fig. 2, the structure also comprises a hub 25 having a flange 26 to which the bolting-on flange 15 and a brake drum 27 are secured, as by usual studs and nuts. The axial section 18a gradually merges into the spoke portions 19a through a widely-rounded annular channel portion 28 impinging a radial wall of the brake drum head, forwardly of which the spokes are offset. This feature additionally trusses the load, utilizing the brake drum to assume part of it, and provides a zone of local flexure between the spokes and inner annulus.

In the form illustrated in Fig. 3, the structure is almost identical with that of Fig. 1, with the exception of radial apertures in the axial section 18b, about which apertures are disposed outwardly projecting perimetral radial flanges 29. A sheet metal ring or band 30 covers the apertures and may be spot welded to the section 18b perimetrally between the apertures, or otherwise shaped and mounted; these apertures providing means, after assembly of the spiders, and before placing the ring 30, for operating radially outwardly through the spokes, from the rear of the bolting-on flange 15, to secure the spokes to the rim.

The ring or band 30 is preferably relatively thin and provided with a radial flange 31 fitted in flat side engagement with, and welded to, the rear side of the rear spider; this angle-section fit of the cover 30 facilitating the assembly thereof by definitely determining its proper position and permitting it to be easily temporarily held during welding.

In Fig. 4, the structure is similar to that of Fig. 1, but having the hub shell 5 removed and a short axial flange 32 substituted therefor, for the reception of a hub cap 33.

In any or all of the forms, the rear spider may further advantageously be of taper gauge or gradually radially outwardly decreasing wall thickness, as shown, whereby to provide a very strong radially inner section modulus and to facilitate die-drawing the shallow channel spoke portions, as well as to effect a better distribution of weight and to increase the strength progressively as it is needed toward the center of the wheel.

What I claim is:

1. An artillery steel wheel comprising a one-piece front spider including a conical nave and spoke portions of rear-opening deep channel cross section having closed outer ends, and a one-piece main load rear spider including a radially inner axial flange, a radial bolting-on flange, a conical annulus diverging forwardly from the bolting-on flange into a rearwardly diverging conical annulus overlapping and secured to the radially inner portion of said nave, and an annular portion extending rearwardly from said rearwardly-diverging annulus in spaced relation to said nave and merging at the rear into front opening shallow channel cross section spoke portions having closed outer ends and secured in their margins to the margins of the front spider spoke portions to form tubular spokes with closed outer ends.

2. An artillery steel wheel comprising a one-piece front spider including a conical nave and spoke portions of rear opening deep channel cross section having closed outer ends, and a one-piece rear spider including an inner radial flange, a conical annulus diverging forwardly from said flange into a rearwardly diverging conical annulus overlapping and secured to the radially inner portion of said nave, and an annular portion extending rearwardly from said rearwardly-diverging annulus in spaced relation to said nave and merging at the rear into front-opening shallow channel cross section spoke portions having closed outer ends and secured in their margins to the margins of the front spider spoke portions to form tubular spokes with closed outer ends.

3. An artillery steel wheel comprising a front spider including a nave and spoke portions of rear opening channel cross section, and a rear spider including an inner radial flange, a conical annulus diverging forwardly from said flange into a rearwardly extending annulus secured to said nave, and an annular portion extending rearwardly from said rearwardly extending annulus in spaced relation to said nave and merging into front opening channel cross section spoke portions, the spiders being secured together in the margins of the spoke portions.

4. An artillery steel wheel comprising a front spider including a nave and spoke portions of rear opening channel cross section, and a rear spider including an inner radial flange, an annulus extending forwardly from said flange into an annulus secured to said nave, and an annular portion extending rearwardly from said secured annulus in spaced relation to said nave and merging at the rear into spoke elements closing said channel cross section spoke portions, the spiders being secured together in the margins of the spoke portions.

5. An artillery steel wheel comprising a front spider including spoke portions and a nave, and a rear spider including an inner radial flange, an annulus extending forwardly from said flange into an annulus secured to said nave, and an annular portion extending rearwardly from said secured annulus in spaced relation to said nave and merging into spoke portions of front opening channel cross section closed by the spoke portions of the front spider.

6. An artillery steel wheel comprising a rim, a front spider including a nave and spoke portions, and a rear spider including an inner radial flange and an annulus extending successively forwardly to the nave and in secured relation thereto and rearwardly in spaced relation to said nave to merge with spoke portions cooperating with the front spider spoke portions to form closed hollow spokes, said annulus having radial apertures through which outer ends of the composite spokes are secured to the rim.

7. An artillery steel wheel comprising a rim, a front spider including a nave and spoke portions, a rear spider including an inner radial flange and an annulus extending successively forwardly to the nave and in secured relation thereto and rearwardly in spaced relation to said nave to merge with spoke portions co-operating with the front spider spoke portions to form closed hollow spokes, said annulus having radial apertures through which outer ends of the composite spokes are secured to the rim, and means closing said apertures.

8. An artillery steel wheel comprising a rim, a front spider including a nave and spoke portions, a rear spider including an inner radial flange and an annulus extending successively forwardly to the nave and in secured relation thereto and rearwardly in spaced relation to said nave to merge with spoke portions co-operating with the front spider spoke portions to form closed hollow spokes, said annulus having radial apertures through which the outer ends of the composite spokes are secured to the rim, and a ring secured to said annulus radially inwardly thereof closing said apertures.

9. An artillery steel wheel comprising a rim, a front spider including a nave and spoke portions, a rear spider including an inner radial flange and an annulus extending successively forwardly to the nave and rearwardly to spoke portions cooperating with the front spider spoke portions to form closed tubular spokes, said annulus having radial apertures through which outer ends of the composite spokes are secured to the rim, and a ring having an axial portion covering said apertures and a radial portion against the rear side of the rear spider.

CAROLUS L. EKSERGIAN.